US005430436A

United States Patent [19]

Fennell

[11] Patent Number: 5,430,436

[45] Date of Patent: Jul. 4, 1995

[54] METHOD AND APPARATUS FOR DISPLAYING A KEYPAD ARRANGEMENT ON A SELECTIVE CALL RECEIVER

[75] Inventor: Robert D. Fennell, Coral Springs, Fla.

[73] Assignee: Motorola, Inc., Schaumburg, Ill.

[21] Appl. No.: 279,313

[22] Filed: Jul. 22, 1994

Related U.S. Application Data

[63] Continuation of Ser. No. 956,314, Oct. 5, 1992, abandoned.

[51] Int. Cl.[6] .......... G06F 7/00; H04Q 7/00

[52] U.S. Cl. .......... 340/825.44; 340/311.1; 345/169

[58] Field of Search .......... 340/825.44, 311.1; 345/1, 169

[56] References Cited

U.S. PATENT DOCUMENTS

| | | | |
|---|---|---|---|
| Re. 32,365 | 3/1987 | Sebestyen | 340/311.1 |
| 3,976,995 | 8/1976 | Sebestyen | 340/337 |
| 4,458,238 | 7/1984 | Learn | 345/165 |
| 4,481,508 | 11/1984 | Kamei et al. | 340/712 |
| 4,518,961 | 5/1985 | Davis et al. | 340/825.44 |
| 4,649,538 | 3/1987 | DeLuca et al. | 371/25.1 |
| 4,755,816 | 7/1988 | DeLuca | 340/825.44 |
| 4,758,829 | 7/1988 | Smith, III | 340/712 |
| 4,881,064 | 11/1989 | Nishino | 345/1 |
| 5,258,739 | 11/1993 | De Luca et al. | 340/825.44 |

FOREIGN PATENT DOCUMENTS

| | | | |
|---|---|---|---|
| 0086255A1 | 8/1983 | European Pat. Off. | G08B 3/10 |
| 0193527 | 2/1985 | Japan | 340/825.44 |

*Primary Examiner*—Donald J. Yusko
*Assistant Examiner*—Edward Merz
*Attorney, Agent, or Firm*—Keith A. Chanroo

[57] ABSTRACT

A selective call receiver (5) comprises receiver circuitry (14) for receiving a message, a display (22) for displaying a key pad arrangement (70) and for displaying the received message in a message display area (68). A microcomputer (20) and user controls (12) interact with the key pad arrangement (70) to modify the received message. A method of displaying the received message comprises the steps of displaying the key pad arrangement (70) and interacting with the key pad arrangement (70) so as to modify the message or add a new message.

15 Claims, 2 Drawing Sheets

METHOD AND APPARATUS FOR DISPLAYING A KEYPAD ARRANGEMENT ON A SELECTIVE CALL RECEIVER

This is a continuation of application Ser. No. 07/956,314, filed Oct. 5, 1992, now abandoned.

FIELD OF THE INVENTION

This invention relates in general to the field of selective call receivers, and more specifically to a method of displaying a key pad arrangement on a selective call receiver display for modifying a received message or adding a new message.

BACKGROUND OF THE INVENTION

Selective call radio receivers such as pagers are used to alert a user of a message. Such devices generally incorporate a radio receiver capable of producing an alerting signal which may be detected by the user. Some pagers provide the additional feature of a message visually displayed on a screen.

The visually displayed message enables the user to read the message immediately or at a later time. Conventional operation allows the user to either save or delete an entire message. The user does not have the option of selecting segments of messages to be saved.

By enabling the user to modify incoming messages, unnecessary information could be eliminated and the desired information saved for future reference. This would make more efficient use of the pager's memory, allowing only the pertinent information to be saved.

Another benefit of eliminating unnecessary information would be the time savings. Conventionally, to retrieve a specific piece of information, the entire message would have to be read. Modifying the message would prevent the user from scrolling through a message unnecessarily while awaiting the desired information.

In addition, the user has not been able to input information into the pager regardless of whether a message has been received. However, the user may want to create a personalized message and enter the message directly into the pager's memory for future reference.

Thus, what is needed is a method of displaying a key pad arrangement on a selective call receiver for modifying a received message and adding new information.

SUMMARY OF THE INVENTION

In accordance with the objects of the present invention in one form, there is provided a selective call receiver comprising a first means for receiving a message, a second means for displaying the received message and a key pad arrangement, and a third means for interacting with the key pad arrangement to modify the received message.

In another form there is provided a method for receiving information by a selective call receiver having a display. The method comprises the steps of displaying a keyboard having a plurality of characters and selecting one or more of the characters for entering information into the selective call receiver.

DETAILED DESCRIPTION OF THE INVENTION

Figure 1:
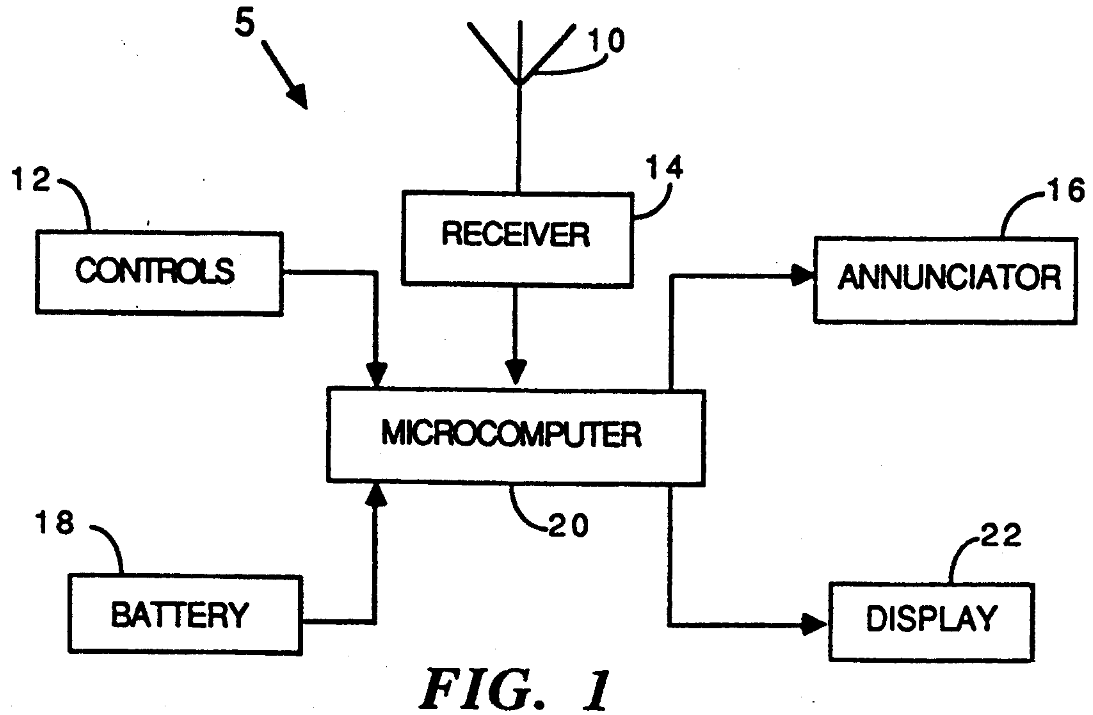
FIG. 1 is a block diagram of a selective call receiver in which the preferred embodiment may be implemented.

FIG. 1 is a block diagram of a selective call receiver generally shown at 5, in which the preferred embodiment of the present invention may be implemented. Selective call receiver 5 includes antenna 10 and receiver 14 for generally receiving transmitted selective call addresses and message information. Selective call receiver 5 also includes microcomputer 20 coupled to an annunciator apparatus 16, a battery 18, a control apparatus 12 such as on/off, volume control, and display control switches, and a display 22 for performing the pager operation well known to those skilled in the art. For a more detailed description of the structure and operation of a selective call radio paging receiver of the type shown in FIG. 1, reference is made to U.S. Pat. No. 4,518,961 by Davis et al., issued May 21, 1985 and entitled "Universal Paging Device With Power Conservation"; U.S. Pat. No. 4,649,538 by DeLuca et al., issued Mar. 10, 1987 and entitled "Radio Paging Device With Improved Test Modes"; and U.S. Pat. No. 4,755,816 by DeLuca, issued Jul. 5, 1988 and entitled "Battery Savings Methods for Selective Radio Paging Receiver", the teachings of which are hereby incorporated by reference. All patents referenced above are assigned to the same assignee as the instant application.

Figure 3:
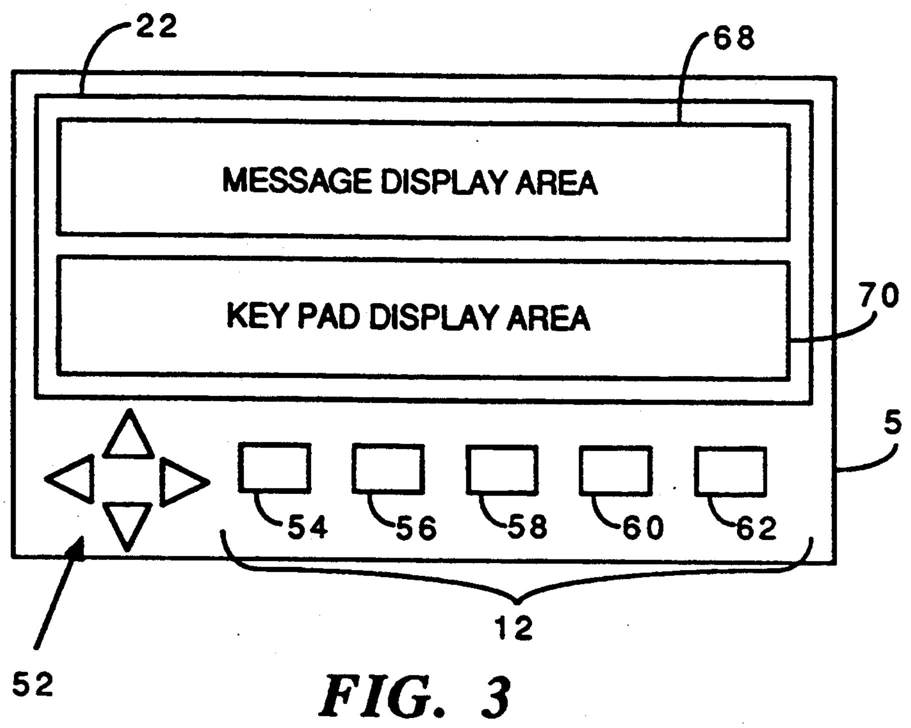
FIG. 3 is a selective call receiver in accordance with the preferred embodiment of the present invention.
Figure 2:
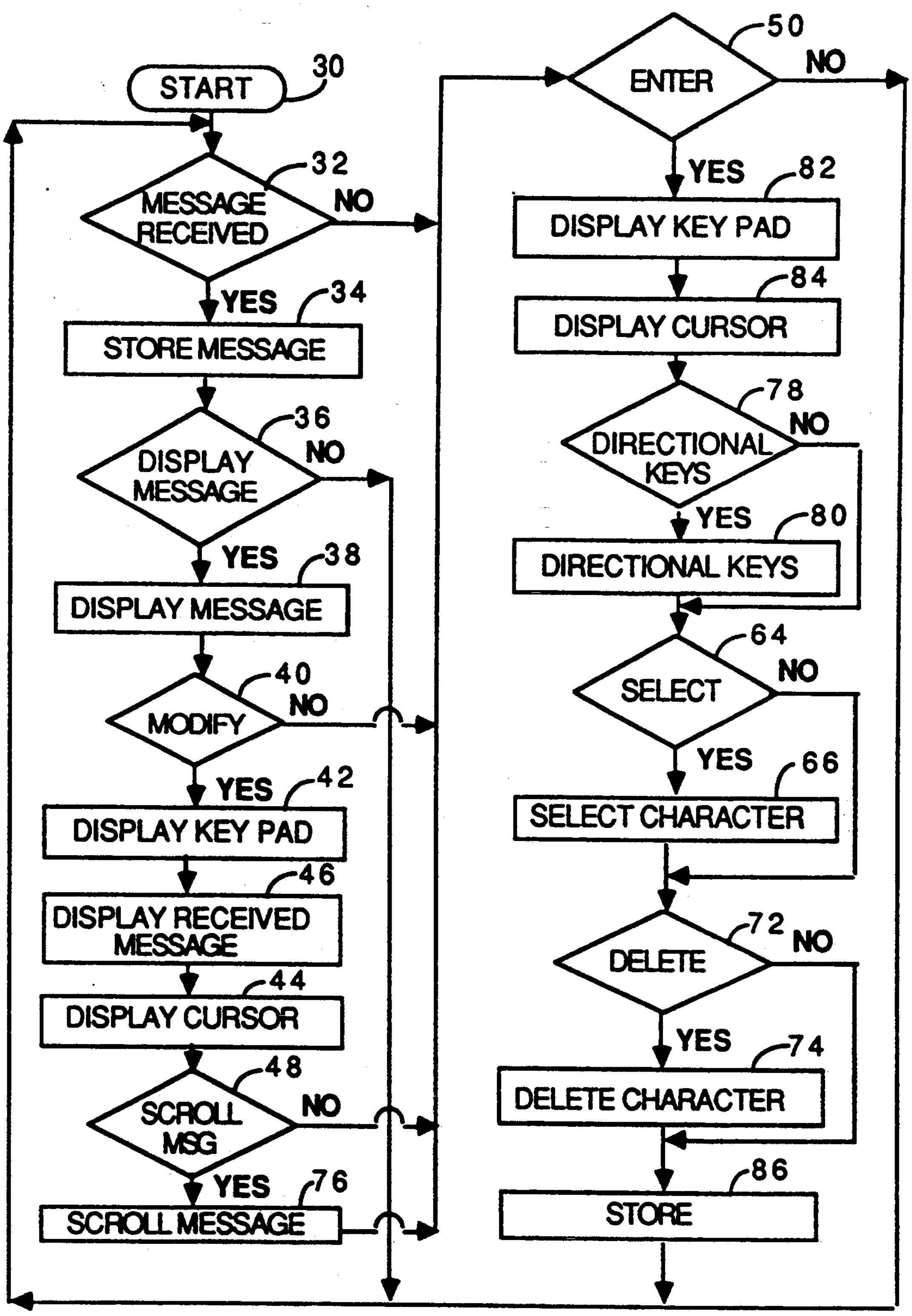
FIG. 2 is a flow chart of the preferred embodiment of the present invention.

Referring to FIGS. 2 and 3, a flow chart in accordance with a preferred embodiment of the present invention illustrates a method for displaying a received message, displaying a key pad arrangement, and interacting with the key pad arrangement so as to modify the message or add a new message. The interaction process is started when the pager is ready to receive a message as is shown at 30.

If a message is received 32, the message will then be stored 34. The message can be displayed 36 at the time it is received or at a later time. If the message is not displayed 36, control will revert back to the beginning of the process where the selective call receiver is ready to receive a message 32. If the message is displayed 38, the option is then available to modify the received message 40. If the message is not modified 40, control will be transferred to step 50, which allows information to be entered independent of the received message 32. If information is not entered 50, control will again revert back to the beginning of the process 32. If the message is to be modified, a key pad will be displayed 42 on, for example, a liquid crystal display. The message can then be modified through direct interaction with the pager. Unnecessary information can be deleted to save memory. Deleting unnecessary information also eliminates time wasted scrolling through entire messages. Another possibility is adding a note to the message as to the action taken. The message will then be stored and control will automatically revert back to the beginning of the process where the selective call receiver is again ready to receive a message.

In the preferred embodiment, the received message 32 is modified 40 by selecting a function from a set of functional controls (ENTER 54, MODIFY 56, SCROLL 58, DELETE 60, SELECT 62) 12 on the selective call receiver 5. By selecting the MODIFY function key 56, the key pad arrangement 42 and the received message 32 are displayed simultaneously in a key pad display area 70 and a message display area 68, respectively. However, the key pad arrangement 42 and received message 32 may optionally be independently displayed without deviating from the intent of the invention. The preferred key pad arrangement 42 comprises a plurality of characters (e.g., the entire English alphabet and/or numerical digits 0–9) displayed by selecting the ENTER function key 54 (adding new information) or the MODIFY function key 56 (modifying the received message). The characters of a variety of languages (e.g., French, Spanish, "kana", etc.) may be displayed on the key pad arrangement 42 without deviating from the intent of the invention.

To add information to the received message, the MODIFY function key 56 is activated resulting in a cursor appearing 44 in conjunction with the displayed message 38 in the message display area 68. The key pad arrangement 42 will likewise appear in the key pad display area 70. The cursor, positioned at the beginning of the message 38, serves as a marker to indicate the location of the desired modification. The message 38 does not need to be scrolled 80 if the information is to be added at the beginning of the message 38. Activating the SCROLL function key 58 (step 48) and a set of directional controls (e.g., UP, DOWN, LEFT, RIGHT) 52, results in the message scrolling 76 in the direction selected. The message 38 is scrolled such that the cursor is positioned at the desired point of modification.

To add information to the received message 38, the ENTER function key 54 (step 50) is activated, thereby displaying the key pad arrangement, step 82, and the cursor, step 84, in the key pad display area 70. Activating the directional keys 52, steps 78 and 80, allows the cursor to select (e.g., highlight or underscore), step 64, any of the displayed alphanumeric characters in the key pad arrangement 42. Activating the SELECT function key 62, step 64, automatically enters the selected character, step 66, in the desired position within the received message 38 and stores the change in memory, step 86. Entire words may be entered in this manner within the received message 38.

Deleting characters (i.e. words), step 72, from the received message involves activating the DELETE function key 60, step 72. To delete a character(s), step 74, within the message 38, both the DELETE function key 60 and the directional keys 52 are activated. This enables the pertinent information to be retained, which saves valuable storage space. The modifications are then stored, step 86, in the memory of the selective call receiver.

In addition, information may be entered into the memory of the selective call receiver 12 in the event that a message is not received 32. The information may be in the form of telephone numbers, addresses, appointments, etc. Information is entered in the same operational manner as adding information to a received message 38; however, the received message is not displayed. The ENTER function key 54 (step 50) is activated, thereby displaying the key pad arrangement, step 82, and the cursor, step 84. The cursor may then be manipulated throughout the key pad 42 using one or more of the four directional keys 52, thereby selecting the desired character. The SELECT function key 62 is then activated (step 64), which enters the character onto the display area 68. The information entered in the display area 68 may then be modified immediately using the DELETE function key 60 (step 72) or at a later time in the same manner as the received message 32, using the MODIFY function key 56 (step 40). The information and modifications are stored into memory, step 86, with control reverting back to the beginning of the process, step 30.

By now it should be appreciated that there has been provided a method of displaying a key pad arrangement on a selective call receiver display for modifying a received message or adding a new message.

I claim:

1. A selective call receiver, comprising:
a receiver for receiving a message;
a display for displaying said received message; and
means, coupled to said display, for activating said display to display a keypad arrangement thereon, the displayed keypad arrangement includes means for modifying which enables a user to interact with said displayed keypad arrangement to modify the displayed message.

2. A method for receiving a message in a selective call receiver, comprising the steps of:
receiving a message;
displaying the received message;
activating the step of displaying for further displaying a key pad arrangement; and
interacting with the displayed key pad arrangement wherein the step of interacting includes a step of user activating the displayed keypad arrangement to modify the displayed message.

3. The method according to claim 2 wherein displaying a key pad arrangement comprises the step of displaying a matrix of alphanumeric characters.

4. The method according to claim 3 wherein the interacting step comprises selecting one or more of the alphanumeric characters to form the modified message.

5. A selective call receiver comprising:
a receiver for receiving a message;
a liquid crystal display (LCD), coupled to the receiver, for displaying the received message on said LCD; and
means coupled to said LCD for selectively activating the LCD for displaying a key pad arrangement on said LCD wherein a user is able to interact with the displayed keypad arrangement for modifying and for adding information to the displayed message.

6. The selective call receiver according to claim 5 wherein said keypad arrangement provides for editing the displayed messages.

7. The selective call receiver according to claim 5 wherein said keypad arrangement provides for creating personalized messages.

8. The selective call receiver according to claim 5 wherein said keypad arrangement provides for determining the language or font in which the displayed message is to be displayed.

9. A selective call receiver comprising:
a receiver for receiving a message;
a liquid crystal display (LCD), coupled to the receiver, for displaying the received message;
a switch, coupled to the LCD, activates the LCD for displaying a key pad arrangement, the displayed keypad arrangement comprises a set of keys to enable a user to modify the displayed message.

10. The selective call receiver according to claim 9 wherein said key pad arrangement comprises a matrix of alphanumeric characters.

11. The selective call receiver according to claim 10 wherein the set of keys comprises one or more control buttons on said displayed keypad arrangement.

12. A selective call receiver comprising:

a liquid crystal display (LCD) that displays a received message; and means for activating the LCD for displaying a key pad arrangement on said LCD, said key pad arrangement being displayed for modifying the displayed message.

13. The selective call receiver according to claim 12 wherein said key pad arrangement displayed for adding information independent of said received message.

14. The selective call receiver according to claim 12 wherein said key pad arrangement comprises alphabetic characters.

15. The selective call receiver according to claim 12 wherein said key pad arrangement comprises numeric characters.

* * * * *

US005430436C1

(12) EX PARTE REEXAMINATION CERTIFICATE (8273rd)

United States Patent

Fennell

(10) Number: US 5,430,436 C1

(45) Certificate Issued: May 31, 2011

(54) METHOD AND APPARATUS FOR DISPLAYING A KEYPAD ARRANGEMENT ON A SELECTIVE CALL RECEIVER

(75) Inventor: Robert D. Fennell, Coral Springs, FL (US)

(73) Assignee: Motorola, Inc., Schaumburg, IL (US)

Reexamination Request:

No. 90/010,805, Dec. 29, 2009

Reexamination Certificate for:

| | |
|---|---|
| Patent No.: | **5,430,436** |
| Issued: | **Jul. 4, 1995** |
| Appl. No.: | **08/279,313** |
| Filed: | **Jul. 22, 1994** |

Related U.S. Application Data

(63) Continuation of application No. 07/956,314, filed on Oct. 5, 1992, now abandoned.

(51) Int. Cl.
*G08B 5/22* (2006.01)

(52) U.S. Cl. ........................ 340/7.55; 340/7.52; 345/169

(58) Field of Classification Search ........................ None
See application file for complete search history.

(56) References Cited

U.S. PATENT DOCUMENTS

| | | | |
|---|---|---|---|
| 4,437,095 | A | 3/1984 | Akahori et al. |
| 4,634,845 | A | 1/1987 | Hale et al. |

FOREIGN PATENT DOCUMENTS

| | | |
|---|---|---|
| JP | H3-50924 | 3/1991 |
| JP | H4-66833 | 6/1992 |

*Primary Examiner*—Christina Y Leung

(57) ABSTRACT

A selective call receiver (5) comprises receiver circuitry (14) for receiving a message, a display (22) for displaying a key pad arrangement (70) and for displaying the received message in a message display area (68). A microcomputer (20) and user controls (12) interact with the key pad arrangement (70) to modify the received message. A method of displaying the received message comprises the steps of displaying the key pad arrangement (70) and interacting with the key pad arrangement (70) so as to modify the message or add a new message.

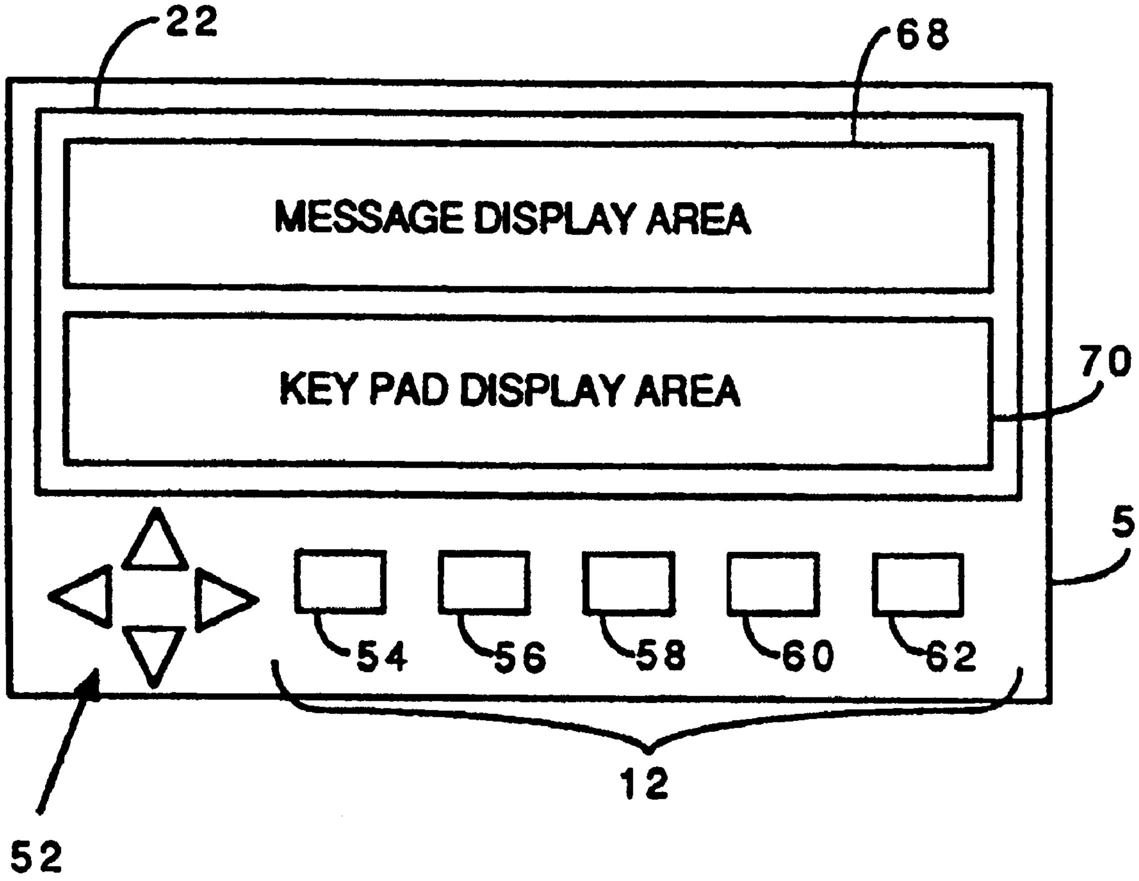

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 5, 9 and 12 are determined to be patentable as amended.

Claims 3, 4, 6-8, 10, 11 and 13-15, dependent on an amended claim, are determined to be patentable.

1. A selective call receiver, comprising:

a receiver for receiving a message;

a display for displaying said received message; and means, coupled to said display, for activating said display to display a keypad arrangement thereon *together with the received message*, the displayed keypad arrangement includes means for modifying which enables a user to interact with said displayed keypad arrangement to modify the displayed message.

2. A method for receiving a message in a selective call receiver, comprising the steps of:

receiving a message;

displaying the received message;

activating the step of displaying for further displaying a key pad arrangement *together with the received message*; and interacting with the displayed key pad arrangement wherein the step of interacting includes a step of user activating the displayed keypad arrangement to modify the displayed message.

5. A selective call receiver comprising:

a receiver for receiving a message;

a liquid crystal display (LCD), coupled to the receiver, for displaying the received message on said LCD; and means coupled to said LCD for selectively activating the LCD for displaying a key pad arrangement on said LCD *together with the received message* wherein a user is able to interact with the displayed keypad arrangement for modifying and for adding information to the displayed message.

9. A selective call receiver comprising:

a receiver for receiving a message;

a liquid crystal display (LCD), coupled to the receiver, for displaying the received message;

a switch, coupled to the LCD, activates the LCD for displaying a key pad arrangement *together with the received message*, the displayed keypad arrangement comprises a set of keys to enable a user to modify the displayed message.

12. A selective call receiver comprising:

a liquid crystal display (LCD) that displays a received message; and means for activating the LCD for displaying a key pad arrangement on said LCD *together with the received message*, said key pad arrangement being displayed for modifying the displayed message.

* * * * *